United States Patent [19]

Fawcett

[11] 4,069,943

[45] Jan. 24, 1978

[54] AUTOMATIC CAROUSEL VENDOR FOR STACKED ARTICLES

[76] Inventor: Michael E. Fawcett, 315 Wilson Mills Road, Chardon, Ohio 44024

[21] Appl. No.: 715,168

[22] Filed: Aug. 11, 1977

[51] Int. Cl.² .............................................. B65G 59/06

[52] U.S. Cl. .......................................... 221/5; 221/121

[58] Field of Search ............... 221/121, 122, 132, 289, 221/290, 298, 5, 133, 241, 242

[56] References Cited

U.S. PATENT DOCUMENTS

| | | | |
|---|---|---|---|
| 3,116,665 | 1/1964 | Reisner | 221/121 X |
| 3,179,289 | 4/1965 | Moyer et al. | 221/121 |
| 3,757,998 | 9/1973 | Millies et al. | 221/242 |

*Primary Examiner*—Stanley H. Tollberg
*Attorney, Agent, or Firm*—Larson, Taylor and Hinds

[57] ABSTRACT

An automatic article vendor is provided for storing a plurality of articles, and for individually dispensing the articles. The vendor comprises a carousel including a plurality of elongate, vertically disposed chambers in which the articles are stacked one on top of another. The carousel is rotatable so that the articles are moved in a circular path preparatory to being vended. A finger is mounted on each chamber, a portion of the finger extending beneath each chamber when the finger is in a support position for supporting the articles stacked thereinabove. The finger also has a release position for individually releasing one of the articles from a chamber. The vendor includes an article select mechanism for selecting a certain article stacked in one of the chambers by urging the corresponding finger into a release position. An aspect of the vendor is an empty indicator for indicating when a chamber no longer has articles stacked therein. Still another aspect of the invention is a partition, positionally mounted in each chamber for allowing the chamber to more closely conform to the size of the articles stacked therein.

6 Claims, 10 Drawing Figures

AUTOMATIC CAROUSEL VENDOR FOR STACKED ARTICLES

BACKGROUND OF THE INVENTION

1. Field of the Invention

This invention relates to automatic article vendors and, more particularly, to vendors for storing a plurality of articles, stacked in columns, and for individually dispensing the articles.

2. Description of the Prior Art

While there exists a variety of bending machines for storing and dispensing articles, a subgroup of these machines have been designed in an attempt to maximize storage capacity without decreasing accessibility to the articles for dispensing purposes. A configuration allowing maximum storage capacity can have, for example, the articles stacked and the stacks grouped together so that the articles are in close proximity to each other. However, in such a configuration, the article can not be stacked so closely so as to make inaccessible any or all of same.

Attempts have been made to obtain optimal storage capacity in vending machines by using barrel or carousel type storage units such as those disclosed in U.S. Pat. Nos. 3,807,788 and 767,121. These carousel storage units include a plurality of generally parallel, spaced shelves having a central hub and a general circular outer edge. The shelves are mounted on an elongate shaft extending through the hubs so that the shelves are perpendicular to the shaft. Each shelf is further sectioned into wedge-shaped portions by wall members extending outwardly from the elongate shaft and perpendicular to the shelf.

The disadvantage with this carousel design is that the shelves themselves occupy space that could otherwise be used to store articles. The article receiving compartments formed by the shelves and walls must be larger than the articles and the spacing between adjacent shelves must be greater than the height of the articles to facilitate article retrieval.

Other prior art devices such as those represented by U.S. Pat. Nos. 1,689,039; 811,756; and a Canadian device employ carousels that allow the article to be stored stacked one on the other in columns, the space consuming shelves being eliminated. In these prior art devices, access to the stacked articles is generally had by removing the articles, one at a time, from the bottom of the stack. In the case of U.S. Pat. No. 1,639,039, the columns of articles are moved along a circular path with the columns of articles in frictional contact with a supporting and stationary base. Preparatory to vending, the column of articles become engaged in a curved guideway recessed in the base and the bottom article in the column is individually sheared away from its column as the column of articles move along this circular path.

The disadvantages inherent in this type carousel are that additional energy must be expended to overcome the above-indicated frictional force, and further, articles so stacked tend to become fouled by the guideways. The Canadian device, however, supports a stack of articles on a pivotable support finger above a stationary base and delivers them one at a time to be dispensed through a trapdoor.

The prior art device disclosed in U.S. Pat. No. 811,756, while utilizing a base that revolves with the stacked article so as to eliminate the aforementioned frictional force, suffers an additional disadvantage also inherent in other prior art. This disadvantage is that the carousel basically can handle only one size of article and there are no provisions to store and individually feed articles of varying sizes.

SUMMARY OF THE INVENTION

The present invention provides for an automatic article vendor for storing a plurality of articles and for individually dispensing the stored articles. The article vendor includes a storage carousel rotatably mounted on a base, the carousel including a plurality of elongate, vertically disposed chambers in which the articles are stacked one on the other. An elongate finger is pivotally mounted on each chamber. A portion of the finger extends beneath the chamber so that the finger will support a stack of articles thereabove. The elongate finger also has a release position wherein it is pivoted from beneath the chamber to individually release an article from the elongate chamber. The vendor also includes an article select mechanism for selecting a certain article stacked in one of the chambers by urging the corresponding finger into a release position.

An aspect of the vendor is an empty indicator for indicating when a chamber no longer has articles stacked therein.

A further aspect of the invention includes elongate partitions adjustably mounted inside each chamber, the positioning of the partitions allowing the chamber to more closely conform to the size of the articles, stacked one on the other. Further, each chamber of the carousel has a vertical opening through which articles can be stacked in the chamber. Thereafter, a hanger bar is placed over the opening to prevent the dislodgment of the articles from the chamber.

Still a further feature of the invention includes a temperature control system for controlling the temperature of the articles, so that, for example, perishable articles can be stored and dispensed.

Additional features and advantages of the invention will be set forth in, or apparent from, the detailed description of the preferred embodiments of the invention found hereinbelow.

DETAILED DESCRIPTION OF THE PREFERRED EMBODIMENTS

Figure 1:
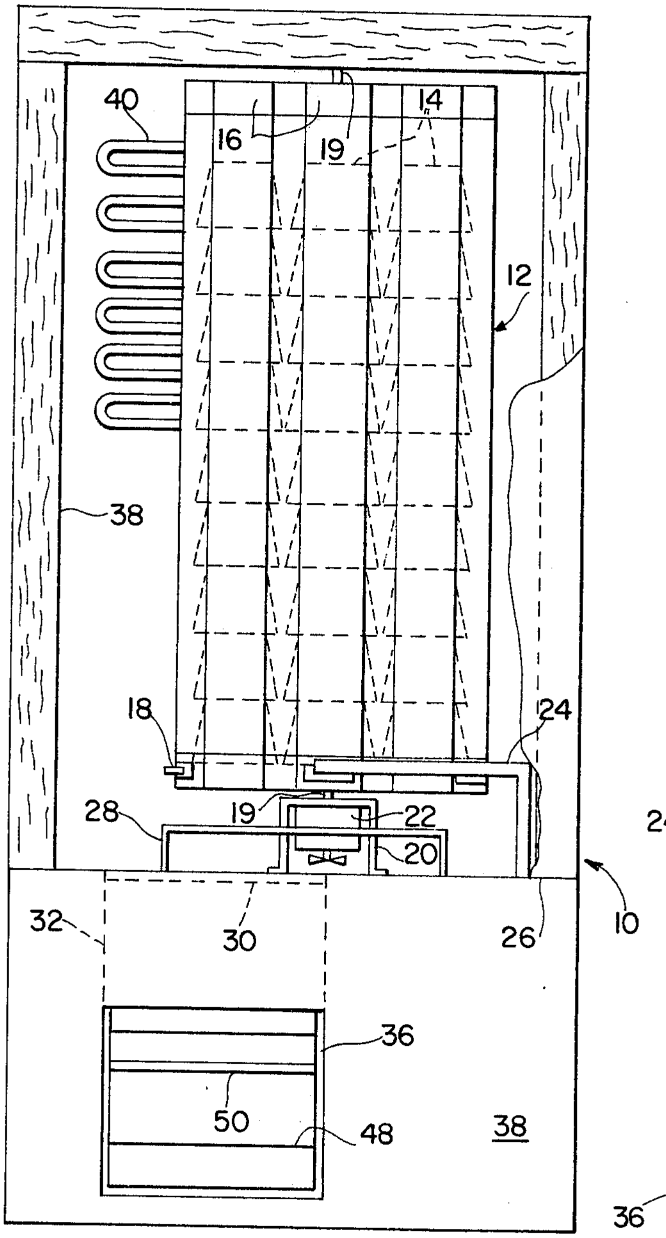
FIG. 1 is a front elevational view of the automatic article vendor in accordance with the invention with the upper portion of the front housing wall removed to reveal a storage carousel.

With reference to the Figures, and in particular to FIG. 1, an automatic article vendor is depicted and comprises a storage carousel 12 for storing columns of stacked articles 14 (shown by a broken line). The articles are retained in elongate, vertically disposed chamber 16 of carousel 12 and supported by an elongate finger 18, a portion of which extends into each chamber 16. Each finger 18 is mounted slightly above the lower end of each chamber 16.

Carousel 12 has a central shaft 19 that is rotatably mounted at its upper end to the top wall of vendor 10 and at its lower end to mounting bracket 20, bracket 20 mounted on base 26. Carousel 12 is rotatingly driven by drive motor 22, which includes a slip clutch for preventing damage, should articles jam. A coin actuated control mechanism (not shown) energizes motor 22. An elongate tripping bar 24 (FIG. 2) is mounted on base 26 and positioned in the rotational path of finger 18. A delivery platform 28 is mounted on base 26 for receiving articles 14 released thereon from chambers 16. The vertical distance between the lower end of carousel 12 and platform 28 is less than the vertical height of article 14. A trapdoor 30, shown by a broken line onto which articles 14 are urged from platform 28, is pivotally mounted on base 26 and is spring biased to a closed position coplanar with the plane of base 26. Delivery chute 32 (broken line) includes an inclined plane, the upper end of which is positioned directly under trapdoor 30. A delivery paddle 34 is rotatably mounted above the lower end of chute 32. A delivery opening 36 formed in a portion of the front housing wall 38 is located at the end of chute 32. Vendor 10 additionally includes insulation lining affixed to the inside of the housing walls. Also refrigeration coils 40 are provided for controlling the temperature of articles 14.

Figure 2:
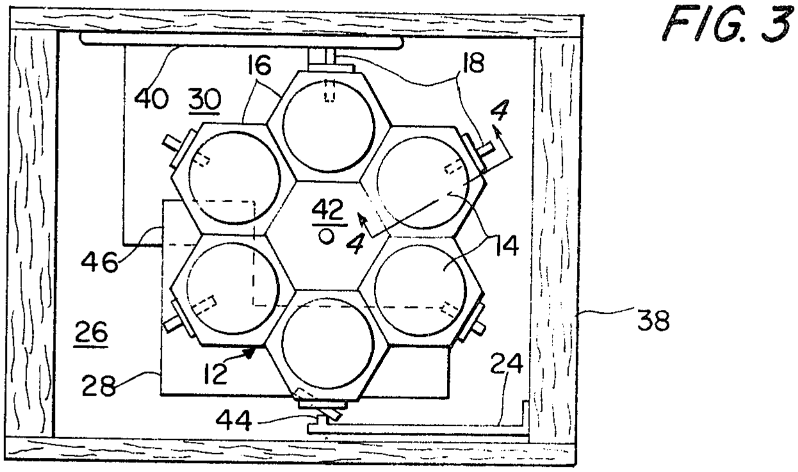
FIG. 2 is a plan view of the vendor with the top housing wall removed.

Referring to FIG. 2, a plan view of carousel 12 depicts a cluster of six hexagonally-shaped chambers 16, with the innermost side of each chamber 16 fixedly attached to a hexagonal plate 42, the plate being located adjacent the upper ends of the chambers. Directly below plate 42 is a similar hexagonal plate (not shown) to which the lower ends of the innermost sides of chamber 16 are rigidly attached. Central shaft 19 extends through the center of these central hexagonal plates and is secured to the plates so that as the shaft rotates, the plates and chambers rotate therewith.

Five of the elongate fingers 18 (shown partially by broken lines) are depicted in their support position, extending into each chamber 16 so as to support a column of articles 14 stacked thereabove. One finger 18 is depicted in a release position, having contacted tripping bar 24 as carousel 12 rotates therepast. A block 44, located at the end of tripping bar 24, urges finger 18 to pivot from under the stack of articles 14 so that an article 14 is released onto L-shaped delivery platform 28 disposed thereunder. Generally, platform 28 is located along a portion of the path of rotation of the carousel. One of the legs of L-shaped platform 28 has an extension 46 thereto that projects out over trapdoor 30.

Figure 3:
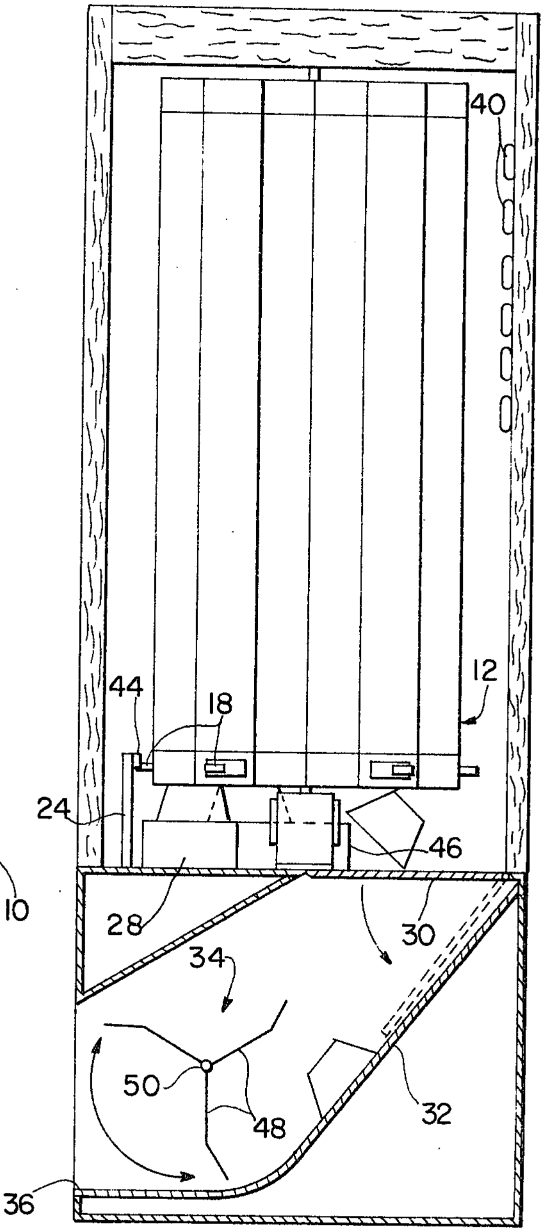
FIG. 3 is an end elevational view of the vendor with the end housing wall removed to reveal the storage carousel and articles in various stages of being delivered by the delivery mechanism.

Referring to FIG. 3, the end wall of vendor 10 has been removed to show trapdoor 30, delivery chute 32 and delivery paddle 34. As previously disclosed, chute 32 includes an inclined ramp, the upper end of which is located directly under trapdoor 30. Trapdoor 30 is pivotally mounted adjacent the uppermost end of chute 32, so as to be downwardly pivotable to the broken line position substantially parallel to the upper portion of chute 32. The lower end of chute 32 merges into the lower edge of delivery opening 36. Above the lower end of chute 32 is a delivery paddle 34 including a plurality of vanes 48 (end view in FIG. 3). An edge of each vane 48 is rigidly attached to a shaft 50 that is rotatably mounted above the lower end of chute 32.

Each vane 48 has an outer end portion which is disposed at an angle slightly inclined to the main body portion of the vane.

Figure 4:
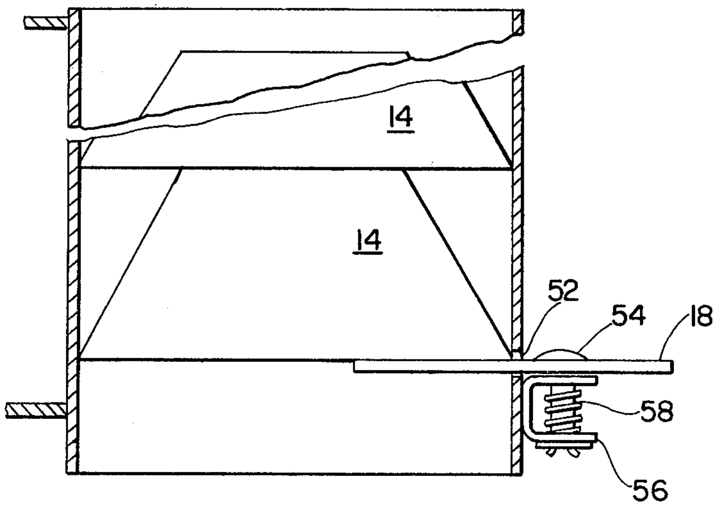
FIG. 4 is an enlarged cross-sectional view taken along line 4—4 in FIG. 2, depicting a finger supporting a column of articles.

An enlarged side view of one of the elongate fingers 18 is depicted in FIG. 4 projecting through an aperture 52 in the side wall of chamber 16. A pin 54 is rigidly attached to finger 18 and extends perpendicularly thereto. Pin 54 is pivotally mounted in C-bracket 56 that is fixedly attached to the side wall of chamber 16. A coiled spring 58 is coaxially mounted about pin 54, one end of spring 58 secured to pin 54, the other end secured to C-bracket 56. Spring 58 biases finger 18 so as to urge finger 18 to the support position, supporting articles 14.

Articles 14, as depicted in FIGS. 2 and 4, have generally a truncated, conical shape including a disc-shaped base, a smaller disc-shaped top, and sloping side walls. Articles 14 can be stacked, one on top of the other so that the smaller, disc-shaped top of one article supports the disc-shaped base of the article stacked thereabove.

It is contemplated that a variety of merchantable matter can be packaged in articles 14. Such matter can include, for example, vegetable or animal matter, in a dry or wet form. Additionally, package shapes other than that detailed hereinabove for article 14 can be accommodated by vendor 10.

Figure 7:
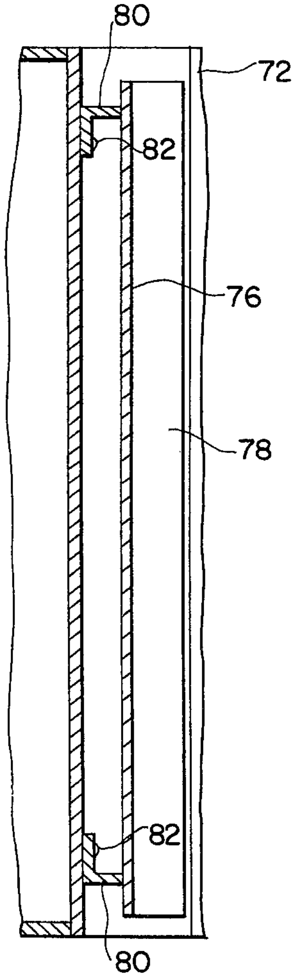
FIG. 7 is a cross-sectional view taken along line 7—7 in FIG. 5.
Figure 5:
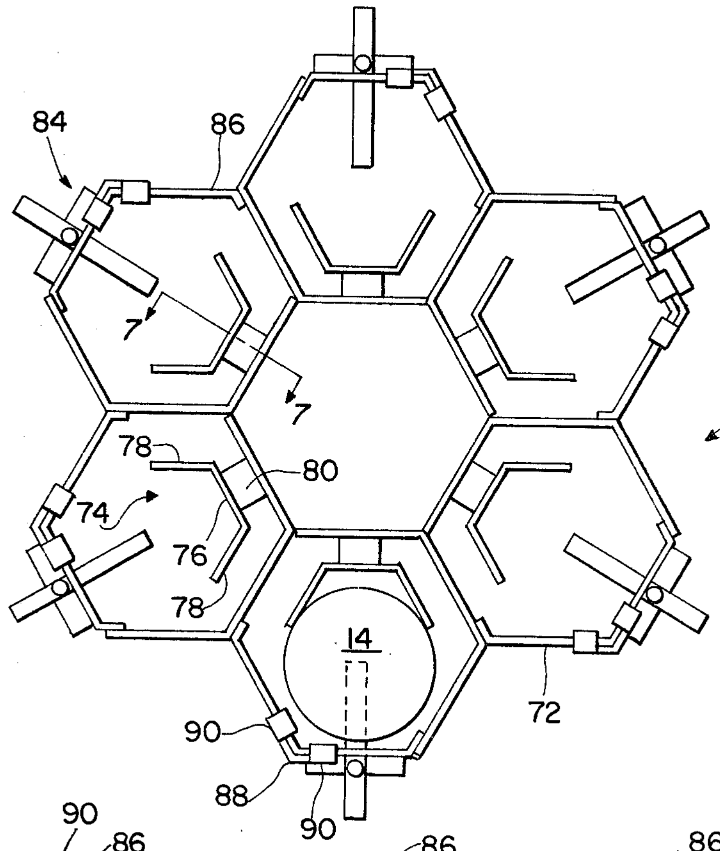
FIG. 5 is a plan view of another feature of the embodiment of the automatic article vendor with the top housing wall removed to reveal a storage carousel adaptable so as to accommodate various article sizes.
Figure 6:
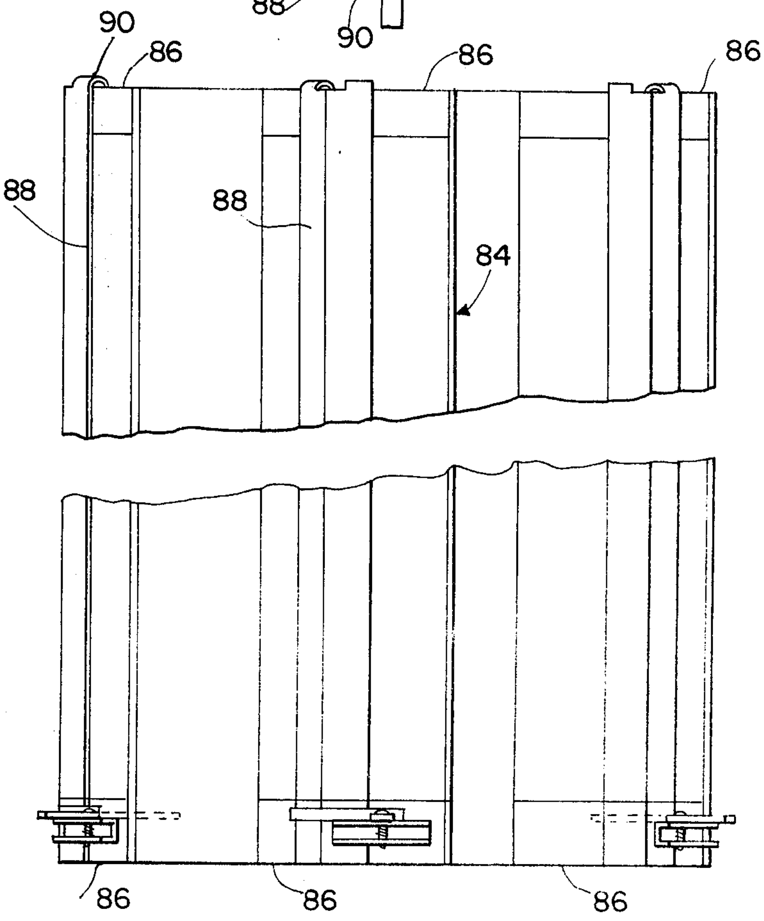
FIG. 6 is a side elevational view of the embodiment depicted in FIG. 5.

Thus, a feature of this embodiment of the invention is depicted in FIGS. 5, 6 and 7. A carousel 70 is modified to accommodate articles of varying sizes and to permit rapid restocking of articles. Referring to FIG. 5, each hexagonal chamber 72 of carousel 70 includes a channel-shaped partition 74. As seen in section 7, partition 74 generally extends for the full length of chamber 72. As seen in Figures 5 and 7, partition 74 includes a back wall 76 and two side walls 78 mounted on opposite edges of back wall 76. Generally, side walls 78 are positioned so as to be inclined to back wall 76 and may be bent to accommodate articles of different sizes.

Back wall 76 is removably mounted on brackets 80 that are themselves secured to a wall of chamber 72 with flat headed expansion screws 82. Brackets 80 have extensions therefor so that the distance between the back walls 76 of partition 74 and the wall of chamber 72 to which brackets 80 are mounted can be varied to allow chambers 72 to accommodate articles of different sizes. Additionally, as previously discussed, the angle that side wall 78 creates with back wall 76 can vary to accommodate articles of different sizes.

A further feature of this embodiment is that chambers 72 have an elongate aperture 84 (FIG. 6) that is bordered at the top and bottom by V-shaped strips 86 secured to sides of chambers 72 adjacent aperture 84. An elongate metallic hanger bar 88, V-shaped in transverse cross-section, with curved upper tabs 90 is hung over the outside of upper V-shaped strips 86. The lower portion of elongate bar 88 hangs down inside chamber 72 so that bar 88 contacts the inside surface of lower V-shaped strip 86. In this position, bar 88 is slightly bowed, so as to be elastically deformed, along its length, and thus the tendency of bar 88 to recover from this deformation keeps the lower portion of bar 88 in contact with the inside surfaces of lower V-shaped strip 86.

To fill each chamber 72, elongate bar 88 is first removed. Thus, through aperture 84 of chamber 72, articles can be stacked in chamber 72. Once the stacking is complete, elongate bar 88 can be replaced so that the articles are securely retained in chamber 72.

The operation of the automatic article vendor is as follows. Initially, each elongate chamber 16 is filled with a column of articles 14, one stacked on top of the other, the column supported in chamber 16 by elongate finger 18 in the support position. Refrigeration coils 40 maintain the articles at a selected temperature. Before vendor 10 is ready for the customer use, vendor 10 must be primed by positioning articles 14 on delivery platform 28. This priming is accomplished by delivery of two articles 14, one from each of two adjacent chambers 16 on to platform 28. In order to accomplish this priming, the coin-operated control is actuated so as to cause carousel 12 to revolve through 60° of a full circle, bringing a finger 18 into sliding contact with block 44 of tripping bar 24. This contact forces finger 18 to pivot from a support position, extending into chamber 16 so as to support a stack of articles 14, to a release position so that finger 18 is no longer supporting the articles 14. The lowermost article 14 drops down to the delivery platform. Carousel 12 continues to complete 60° revolution, bringing finger 18 out of sliding engagement with block 44. Finger 18 is urged by spring 58 to pivot back into a support position, engaging the inclined side of lowermost article 14 as it drops to platform 28 until finger 18 is in the support position so as to engage the bottom of the article above the article deposited on the delivery platform.

The coin operated control mechanism is again activated with the resultant 60° revolution of carousel 14. As the next adjacent chamber 16 is revolved into a position preparatory to delivery a second article 14 to platform 28, the previously delivered article 14 is moved along L-shaped platform 28. This movement occurs by reasons of the fact that the upper end portion of the article on the platform extends into the lower end portion of chamber 16. Thus as the carousel rotates, the article on the platform will rotate with it.

After two articles 14 are delivered to platform 28, the vendor is ready for customer use. The customer inserts coins into the coin-operated control mechanism which rotates carousel 12 so as to bring a chamber 16 into position to deliver another article 14 onto platform 28. Simultaneously, the first article 14 on the platform is moved onto extension 46 (FIG. 3) of platform 28, finally dropping from extension 46 onto trapdoor 30. The added weight of article 14 on trapdoor 30 causes trapdoor 30 to pivot downwardly into a position generally parallel with chute 32. Article 14 slips from trapdoor 30, sliding down chute 32, striking a vane 48 of delivery paddle 34 and rotating paddle 34 through about a 120° revolution. At this point, the customer can see and reach article 14 through delivery opening 36. FIG. 3 depicts article 14 being urged through the above indicated delivery operation.

Figure 8:
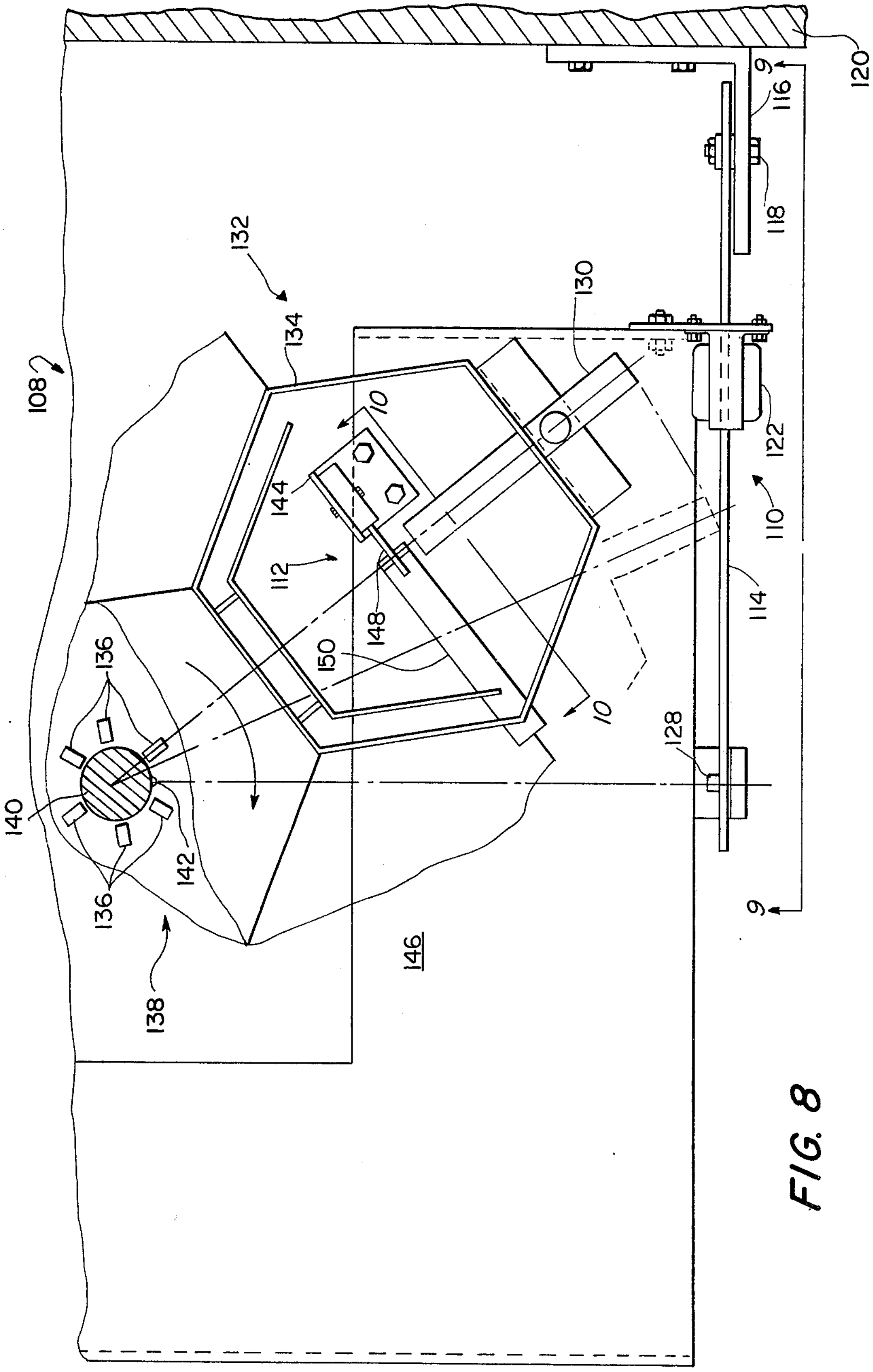
FIG. 8 is a plan view of another embodiment of the vendor with the top housing wall removed to reveal an article select mechanism and an empty indicator.
Figure 9:
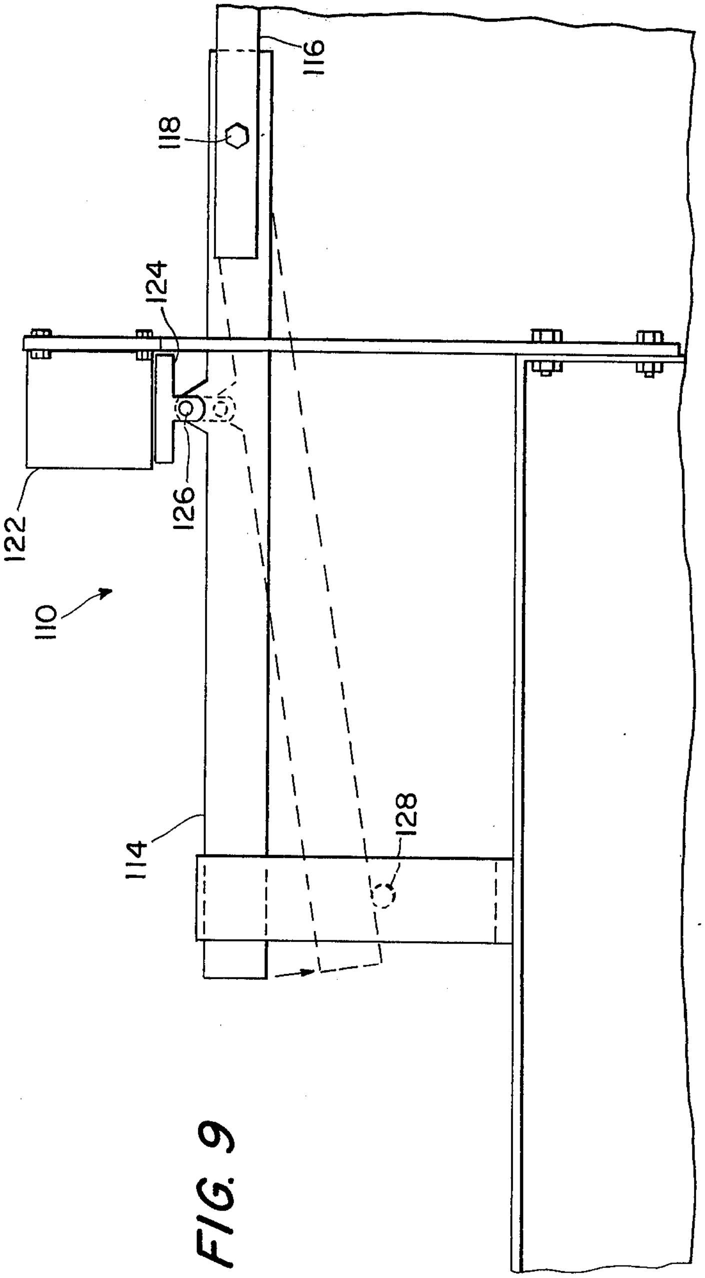
FIG. 9 is a side elevational view taken along line 9—9 in FIG. 8 depicting the article select mechanism.
Figure 10:
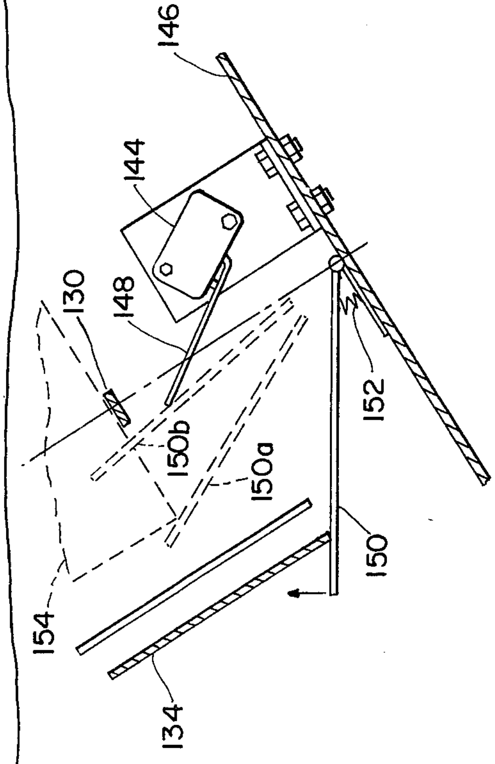
FIG. 10 is a side elevational view taken along line 10—10 in FIG. 8 depicting the empty indicator.

Another embodiment of the vendor is depicted in FIGS. 8, 9, and 10. Referring to FIG. 8, vendor 108 includes an article selection mechanism 110 and an empty indicator 112. Article selection mechanism 110 includes a tripping bar 114 that is pivotally secured to bracket 116 by pivot pin 118, bracket 116 rigidly secured to side housing wall 120. Referring to FIG. 9, a solenoid 122 is mounted above tripping bar 114, one end of the piston 124 of solenoid 122 pivotally secured by pivot pin 126 to a central portion of tripping bar 114. In an unenergized state solenoid 122 allows tripping bar assume an inclined orientation indicated by the broken line so as to rest against stop 128. In this inclined orientation, support finger 130 (FIG. 8) of carousel 132 (FIG. 8) can not strike bar 114 as finger 130 rotates therepast. In an energized state, solenoid 122 pivots tripping bar 114 to the horizontal orientation depicted in FIG. 9. In this horizontal orientation, support finger 130 (FIG. 8) can strike bar 114 as finger 130 rotates therepast.

Since as many as six different types of articles having differing contents can be stored in the six chambers, one of which is chamber 134 (FIG. 8) of carousel 132, a chamber position sensor 138 (FIG. 8) is used to determine the position of the chambers. Sensor 138 includes six micro-switches 136, mounted below carousel 132 and spaced at about 60° intervals about central shaft 140 on which carousel 132 is rotatably mounted. Shaft 140 includes a boss 142 that strikes microswitches 136 as carousel 132 revolves, thereby indicating the position of the chambers.

A further feature of this embodiment is empty indicator 112. Referring to FIGS. 8 and 10, indicator 112 includes a microswitch 144 mounted on L-shaped delivery platform 146 having a trigger arm 148. A lever arm 150 is urged by spring 152 to vertical positions 150*a* and 150*b*, indicated by broken lines. If an article 154 is positioned above finger 130 (FIG. 10) arm 150 will strike first chamber 134, and then article 154, indicated by position 150*a* as carousel 132 rotates. However, if no articles are positioned above finger 130, arm 150 is urged to position 150*b* and strikes microswitch trigger arm 148, thereby indicating an empty column 134.

The operation of this embodiment of the invention is as follows. As a select button (not shown) mounted on the external face of the vendor housing is depressed, the carousel is rotated clockwise. Boss 142 on central shaft 140 makes six individual contacts with microswitches 136 as carousel 132 rotates through one turn, each contact lighting in turn a light adjacent the above-mentioned button. The lights indicate which article of a possible selection of up to six articles stored in the six chambers of carousel 132 is in position to be dispensed. Thus when a light becomes energized, the corresponsing chamber with the desired article is immediately adjacent tripping bar 114 and above empty indicator 112. If there is no article in the chamber, lever arm 150 can assume verticle position 150*b*, thereby striking microswitch trigger arm 148 and activating an empty status light located adjacent the above-mentioned light on the face of the housing. Microswitch 144 will simultaneously deactivate the vendor coin mechanism (not shown), preventing the vendor from accepting coins. If, however, the chamber has articles therein, lever arm 150 will be prevented from striking microswitch arm 148. The vendor can then accept the customer's coins. When the money is deposited, solenoid 122 pivots tripping bar 114 to a horizontal position. Simultaneously, carousel 132 rotates so that finger 130 strikes bar 114 (shown by a broken line in FIG. 8). Bar 114 urges finger 130 to pivot relative to chamber 132 allowing an article to fall onto platform 146. The article is then urged along the platform by the lower edge of chamber 134 until the article falls through a trapdoor (not shown in FIG. 8) and is dispensed to the customer.

Although the present invention has been described relative to exemplary embodiments thereof, modifications and variations can be effected in these embodiments without departing from the scope and spirit of the invention.

I claim:

1. An automatic vendor for storing at least a plurality of a first article and a plurality of a second article and for individually dispensing the articles, comprising:

a base;

a carousel for storing the articles rotatably mounted on said base;

motor means for rotating said carousel;

a plurality of elongate, vertically disposed chambers mounted on said carousel, one of said chambers storing a stack of the first articles and one of said chambers storing a stack of the second articles;

an elongate finger pivotably mounted on each chamber, a portion of said finger extending into each chamber when said finger is in a support position for supporting the articles stacked thereinabove;

means for sensing the location of said chambers as the carousel rotates and for producing a signal upon sensing a preselected chamber;

means for dispensing one of the articles stacked in the preselected chamber, said means including a selection arm pivotally mounted to said base and a means responsive to said signal for pivoting said arm to a dispensing mode just prior to the preselected chamber's rotating past said arm, said arm being maintained in a non-dispensing mode when the non-selected chambers are rotated past said arm, said arm when in said dispensing mode urging said finger of said selected chamber when rotated past said arm, to pivot from under the stack of articles, releasing one of the articles, said arm in a non-dispensing mode allowing said support fingers to remain in the support position while rotating past said arm.

2. An apparatus in accordance with claim 1 wherein said arm pivoting means includes a solenoid pivotably secured to said arm for pivoting said arm between a dispensing mode and a non-dispensing mode.

3. An automatic vendor as claimed in claim 1 wherein the portions of all of said fingers urged by said arm are at substantially the same height and whereby said arm is automatically moved by said pivoting means into engagement with the corresponding finger of the preselected chamber at the appropriate time.

4. An automatic article vendor for storing a plurality of articles and for individually dispensing the articles comprising:

a base;

a carousel for storing the plurality of articles mounted on said base;

motor means for rotating said carousel;

a plurality of elongate, vertically disposed chambers mounted on said carousel for stacking articles one on top of another;

an elongate partition adjustably mounted inside said chambers, wherein said partition includes a back wall disposed adjacent a side wall of said chamber and at least one side wall adjustably mounted on said back wall, the positioning of said back wall relative to said chamber also causing said attached side wall to move resulting in both said back wall and side wall to more closely conform to the size of the articles stacked therein;

an elongate finger pivotably mounted on each chamber, a portion of said finger extending into each chamber when said finger is in a support position for supporting the articles stacked thereabove; and a means for moving said finger to a release position for releasing one of the articles from the chamber as said motor rotates said carousel past said means.

5. Ab automatic article vendor for storing a plurality of articles and for individually dispensing the articles, comprising:

a base;

a carousel rotatably mounted on said base for storing the articles;

motor means for rotating said carousel;

a plurality of elongate, vertically disposed chambers mounted on said carousel, said chambers storing a stack of the first articles;

an elongate finger pivotably mounted on each chamber, a portion of said finger extending into each chamber when said finger is in a support position for supporting the articles stacked thereabove;

means for selecting one of said chambers for dispensing one of the articles stacked therein, said means including a selection arm pivotably mounted to said base and a means for pivoting said arm between a dispensing mode and a non-dispensing mode, said arm in a dispensing mode urging said finger of said selected chamber, when rotated past said arm, to pivot from under the stack of articles, releasing one of the articles, said arm in a non-dispensing mode allowing said support fingers to remain in the support position while rotating past said arm; and a means for sensing the presence of articles in said chambers, said means including a switch secured to said base, so as to be directly below the path of rotation of said chambers, said sensing means further including a sensing arm, one end of said arm pivotably secured to said base, the other end of said arm spring urged upwardly toward the lowermost portion of said chambers, said arm urged upwardly so as to strike said switch when said chamber thereabove is empty, said arm prevented by an article present in said chamber from reaching the most upward orientation and striking said switch.

6. An automatic article vendor for storing a plurality of articles and for individually dispensing the articles, comprising:

a base;

a carousel for storing the articles and including a shaft, said shaft being rotatably mounted on said base;

motor means for rotating said carousel;

a plurality of elongate, vertically disposed chambers mounted on said carousel, said chambers storing a stack of the articles;

an elongate finger pivotably mounted on each chamber, a portion of said finger extending into each chamber when said finger is in a support position for supporting the articles stacked thereabove;

means for selecting one of said chambers for dispensing one of the articles stacked therein, said means including a selection arm pivotably mounted to said base and a means for pivoting said arm between a dispensing mode and a non-dispensing mode, said arm in a dispensing mode urging said finger of said selected chamber, when rotated past said arm, to pivot from under the stack of articles, releasing one of the articles, said arm in a non-dispensing mode allowing said support fingers to remain in the support position while rotating past said arm; and means for indicating the location of said chamber of said carousel, said means comprising a plurality of switches secured to said base and spaced about said shaft, each of said switches corresponding to one of said chambers and wherein said shaft has a protruding boss, said boss striking each of said switches as said shaft revolves.

* * * * *